(12) United States Patent
Green

(10) Patent No.: US 6,308,064 B1
(45) Date of Patent: Oct. 23, 2001

(54) AIR INTERFACE BASED WIRELESS TELECOMMUNICATION TEST SYSTEM

(75) Inventor: Per Green, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/195,671

(22) Filed: Nov. 19, 1998

(51) Int. Cl.⁷ .................................................. H04Q 7/20
(52) U.S. Cl. ......................... 455/423; 455/67.2; 455/67.1
(58) Field of Search ................................. 455/446, 423, 455/67.4, 561, 562, 67.1, 67.2, 115; 342/169, 171, 172, 368, 423, 437; 343/703

(56) References Cited

U.S. PATENT DOCUMENTS

| | | | | |
|---|---|---|---|---|
| 4,225,969 | * | 9/1980 | Hong | 455/67.4 |
| 4,361,904 | * | 11/1982 | Matsumura | 455/67.7 |
| 5,095,500 | * | 3/1992 | Tayloe et al. | 379/32 |
| 5,109,535 | * | 4/1992 | Kume et al. | 455/67.4 |
| 5,157,709 | * | 10/1992 | Ohteru | 455/465 |
| 5,425,076 | * | 6/1995 | Knippelmier | 379/27 |
| 5,465,393 | * | 11/1995 | Frostrom et al. | 455/423 |
| 5,666,123 | * | 9/1997 | Chrystie | 342/373 |
| 5,742,584 | * | 4/1998 | Meredith | 370/210 |
| 5,794,128 | * | 8/1998 | Brockel et al. | 455/67.1 |
| 5,861,844 | * | 1/1999 | Gilmore et al. | 342/374 |
| 5,913,638 | * | 10/1999 | Robbins et al. | 405/179 |
| 5,946,612 | * | 8/1999 | Johansson | 455/405 |
| 5,966,094 | * | 10/1999 | Ward et al. | 342/373 |
| 6,011,830 | * | 1/2000 | Sasin et al. | 379/1 |
| 6,011,962 | * | 1/2000 | Lindenmeier et al. | 455/226.1 |
| 6,021,315 | * | 2/2000 | Telewski | 455/67.1 |
| 6,023,621 | * | 2/2000 | Jackson et al. | 455/452 |
| 6,038,459 | * | 3/2000 | Searle et al. | 455/562 |

FOREIGN PATENT DOCUMENTS 725498  8/1996  (EP) .

OTHER PUBLICATIONS

European Search Report re RS 102236 Date of mailing of search: May 17, 1999.

* cited by examiner

*Primary Examiner*—Nay Maung
*Assistant Examiner*—Sonny Trinh
(74) *Attorney, Agent, or Firm*—Burns, Doane, Swecker & Mathis, L.L.P.

(57) ABSTRACT

An antenna test system is used for testing wireless telecommunication systems. In an embodiment of the invention, the test system includes an antenna array comprising a plurality of individual antennas that are deployed in a pattern within a confined testing area such as in a building or laboratory. A plurality of base stations are selectively connected to the antennas via an antenna matrix. When the antenna matrix makes a connection between a base station and an antenna, a cell is activated accordingly. At least one mobile is positioned in fixed location and operates within range of an activated cell wherein various test procedures are run and monitored by a remote computer workstation. The invention is particularly suitable for testing problems associated with handoff procedures and interference by sequentially shifting activated cells relative to the stationary mobiles. The inventive technique provides consistent conditions necessary for repeat testing for use in system optimization.

16 Claims, 4 Drawing Sheets ized to provide a test environment that a provide
AIR INTERFACE BASED WIRELESS TELECOMMUNICATION TEST SYSTEM

FIELD OF THE INVENTION

The present invention relates generally to wireless telecommunication systems. More specifically, the invention relates to a system for testing wireless telecommunication systems using the air interface.

BACKGROUND OF THE INVENTION

In a basic cellular telecommunication system, a mobile switching center (MSC) is linked to a network of base stations by a series of digital transmission links. The base stations are geographically distributed to form an area of coverage for the system. Each base station is designated to cover a specified area, known as a cell, in which a two way communication can take place between a mobile station and the base station in the associated cell. The mobile station operating within a cell communicates with the base station over the air interface on a specified radio channel. For simplicity, the term mobile station will henceforth be referred to simply as the mobile.

Manufacturers of wireless telecommunication equipment have long recognized the importance of testing the equipment prior to installation in the field. Many of the tests performed on the base station equipment and the mobile switching center (MSC) are typically well developed and do a good job of simulating real-life conditions. Other areas, such as those involving the air interface, have generally not been tested as rigorously, partly due to the inherent environmental randomness associated with the radio path thus leading to a lack of repeatability in testing procedures. For example, the actual environment a service provider operates in can contain a number of factors that are difficult to recreate in a test environment such as changing weather conditions, interfering signals, log normal and multi-path fading from obstacles and/or terrain etc. The precise conditions are often difficult to recreate in a laboratory back at the manufacturing site.

A further complicating factor is that there is a limit to the amount and types of tests that can be performed at the installation site without significantly affecting current service. Since the environmental conditions at an operating site cannot be guaranteed to remain consistent, it may be difficult to compare results from repeated tests with much confidence. Thus the system reliability and robustness of the controlling software become difficult to verify from repeated testing where conditions need to be held constant.

In prior testing methods, there have been attempts made to simulate the air interface in testing procedures in a laboratory environment. One example known in the art is to use a coaxial cable to connect the mobile to the base station to form a coaxial network air interface. This type of system has a number of disadvantages, notably that the isolated coaxial cables do not provide a suitable life-like radio path that is susceptible to any number of problematic elements as in an actual operating environment. A more detailed discussion of a coaxial network for simulating the air interface is described in U.S. Pat. No. 5,465,393 granted to Frostrom et al. entitled: "Simulated Air Interface System for Simulating Radio Communication", issued on Nov. 7, 1995 to the present assignee and is incorporated by reference herein in its entirety.

FIG. 1 illustrates a typical prior art coaxial network testing system for use in simulating the air interface for test operations. A plurality of mobiles, referred collectively by the reference numeral 100, are each connected to a base station 110 via individual coaxial cables 120. The connection is made by connecting one end of coaxial cable 120 to the antenna port of each of the mobiles and connecting the other end to base station 110. The cables provide individual shielded radio paths to and from each of the mobiles to the base station thus allowing a large number of mobiles to be conveniently tested from one location. In addition, very precise control of the signal strengths to and from the mobile can be achieved thereby providing suitable conditions for repeat testing. A computer 130 is connected via link 140 to each of the mobiles in order to automate the testing procedure and monitor and record the results.

A disadvantage of using a coaxial network is that the same radio path is used for both the transmission and reception of signals thereby unrealistically isolating the mobile from signals from other mobiles i.e. co-channel interference. This is not suitable for testing problems arising from the interaction of signals from other mobiles such as mass traffic testing. Mass traffic testing includes testing the system during mass registrations and mass call setups by a large number of mobiles which better simulates real-life situations. This has become an area of growing importance since sustained high traffic conditions may lead to access collisions arising from a large number of mobiles attempting to simultaneously access a limited bandwidth channel. Thus a coaxial based network is unsuitable for this type of testing.

In view of the foregoing, it is desirable to provide a testing platform that more closely approximates real-life conditions with regards to the air interface. A further desire is to provide a test environment that maintains consistent conditions which permit repeat testing.

SUMMARY OF THE INVENTION

Briefly described, and in accordance with an embodiment thereof, the invention discloses an indoor antenna test system for use in testing wireless telecommunication systems. In an embodiment of the present invention, the test system includes an antenna array comprising a plurality of individual antennas that are deployed in a predetermined and fixed pattern within a confined testing area such as a building or a laboratory. Further, a plurality of base stations are connected to the antennas via an antenna matrix. When the antenna matrix makes a connection between a base station and an antenna, a cell is activated accordingly. The antenna matrix can be controlled by a computer workstation to automatically activate cells in a predetermined sequence according to a specified testing procedure. A mobile is preferably located in fixed position and operating within an activated cell such that test procedures are executed and monitored by a remote computer workstation. Alternatively, a plurality of operable mobiles may be included within the individual cells for tests involving mass traffic and/or interference.

The present invention is particularly suitable for testing the air interface in a limited testing area by using real antennas that have the same propagation properties as those operating in the field. Furthermore, testing of handoff procedures and interference problems are readily achieved by appropriately shifting the active cell relative to the stationary mobile. Since all components can be stationary, the environmental conditions remain constant thereby permitting tests to be repeated for optimizing system parameters. These and other advantages of the present invention will become apparent upon reading the following detailed description and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
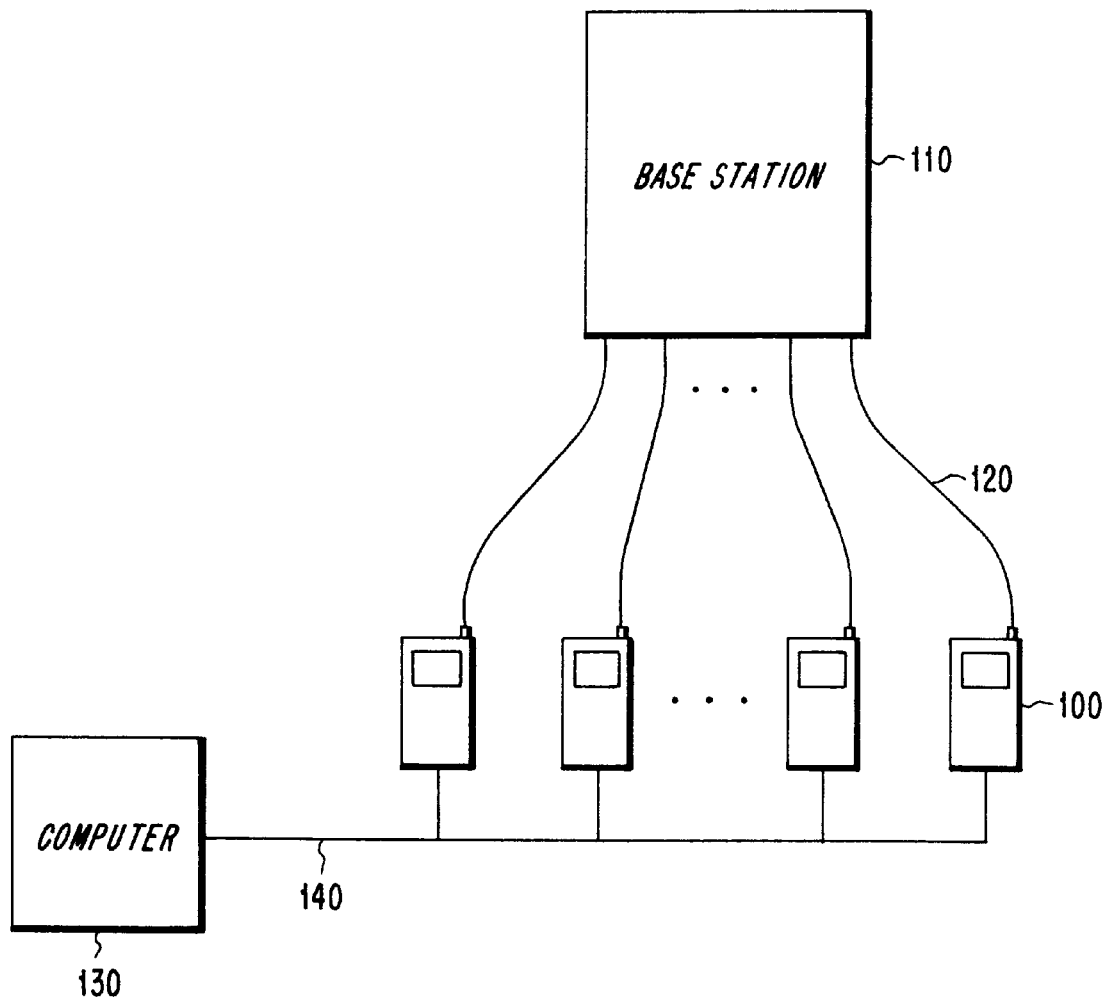
FIG. 1 illustrates a prior art coaxial network testing system.
Figure 2:
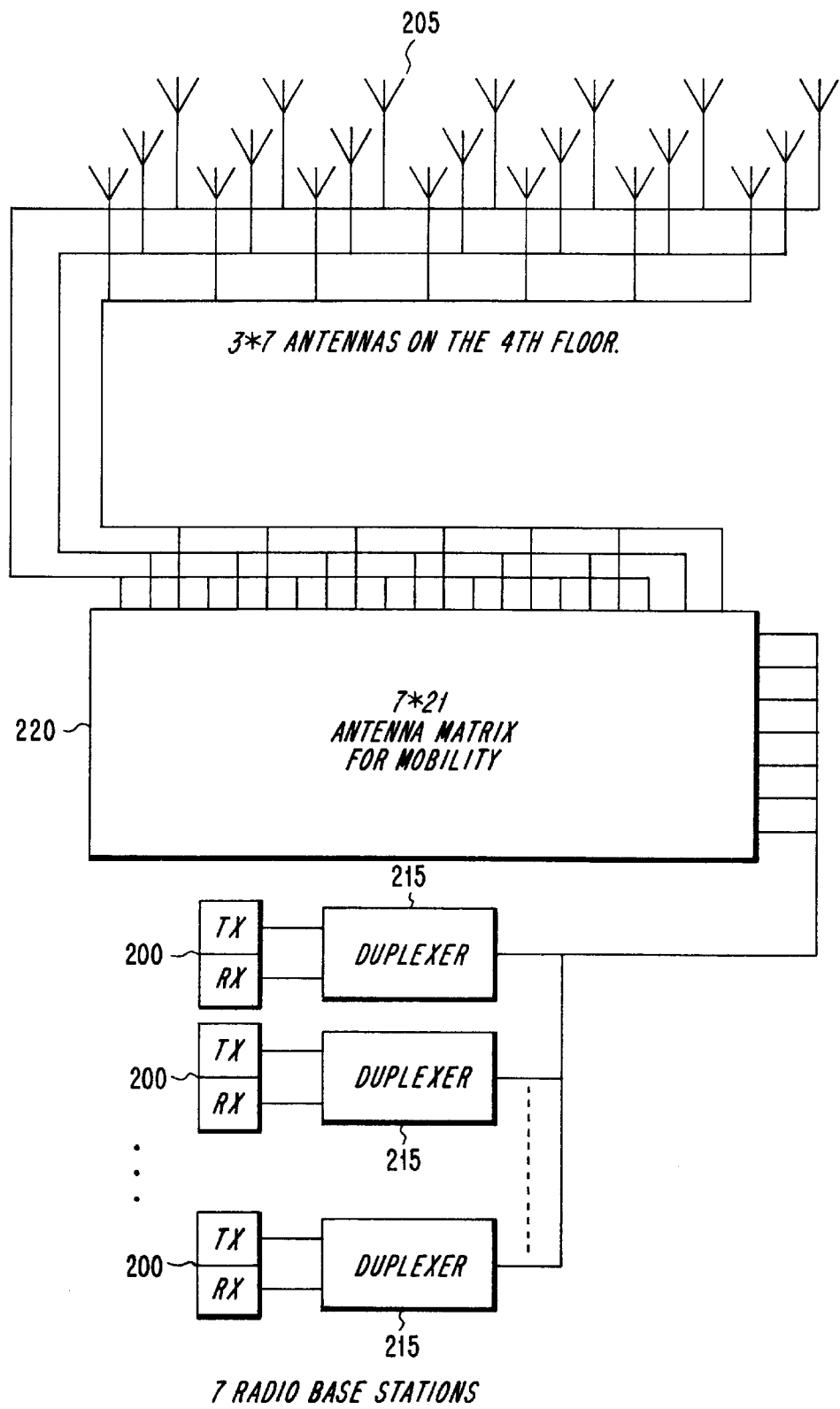
FIG. 2 is an exemplary embodiment of an indoor antenna system operating in accordance with the present invention.

FIG. 2 illustrates an exemplary embodiment of a test system operating in accordance with the present invention. Depicted is a testing configuration comprising seven base stations, collectively referred to as reference numeral 200, that are connected to an array of twenty one antennas collectively referred to as 205. The configuration shown represents what is known in the art as a 7/21 cell plan and wherein the cell plan is indicative of the frequency reuse distance. It should be noted that the number of base stations and antennas i.e. cell plan used in the embodiment is arbitrary and can be appropriately scaled up or down to formulate a particular set of test conditions. The base stations 200 are represented as a transceiver (TX) and receiver (RX) and are coupled to a duplexer 215. The duplexer 215 separates the transmitted signals to and received signals from the antenna array 205. It will be understood by those skilled in the art that other detailed component blocks and devices of an operating test system are not shown in the exemplary illustration for purposes of simplification.

The array of antennas 205 are deployed in a pattern suitable for use within a confined laboratory space or test area. In the present embodiment, the antennas 205 are distributed within the coverage area such that the distance from an arbitrary point within the coverage area to the nearest antenna is preferably in the range of 3–15 meters. It should be noted that this distance can also be varied of course to suit particular area constraints. Furthermore, the distribution of antennas is administered in accordance with the cell plan selected to generate the desired testing conditions. The base stations 200 and antennas 205 are coupled with leads to an antenna matrix 220 which completes the connection of the individual base stations to the antennas. The leads that couple the base stations and antennas to the antenna matrix 220 are typically shielded coaxial cables to provide suitable signal transmission and isolation. In the embodiment, the matrix 220 can be a standard off-the-shelf RF cross connect matrix which functions by cross connecting at least one antenna with an associated base station at any given time by way of a linked computer workstation (not shown).

Each antenna, when connected to a base station, creates an active cell for use in testing the air interface with a suitable mobile. The activated cells can be controlled by a computer workstation, for example, to synchronize the timing of the activated cells for simulating movement of a stationary mobile. This aspect of mobility is easily achieved by the manipulation of activated cells by programming the workstation via the antenna matrix 220 such that the appropriate base stations and the associated antennas are connected in a predefined pattern. In an alternative aspect of the embodiment, tie overall space efficiency of the test system can be improved by the installation of the test components in separate locations, for example, the base stations may be located on a separate floor or room from the antennas.

Figure 3:
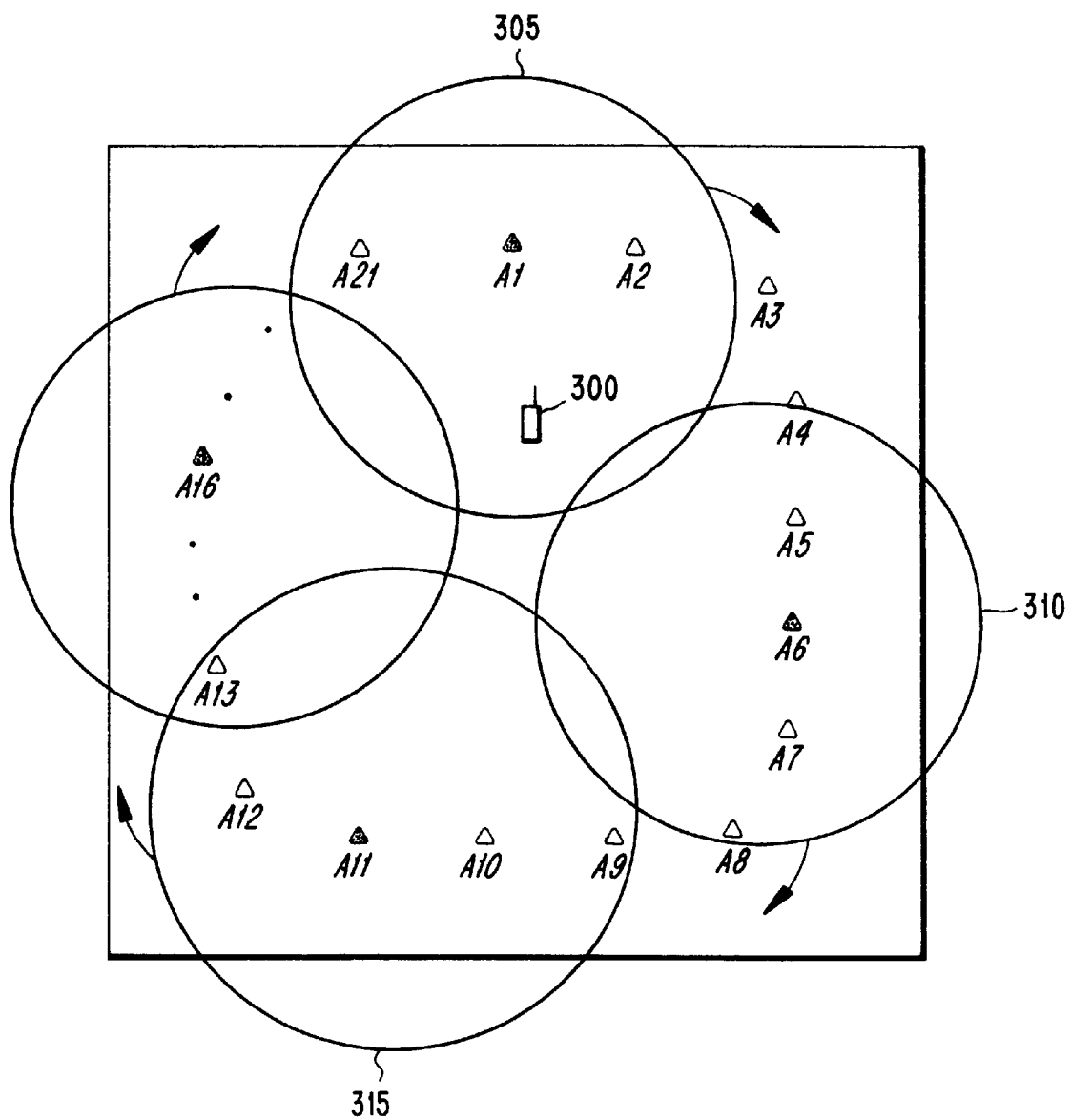
FIG. 3 illustrates the present invention deployed in an exemplary indoor testing area.

FIG. 3 illustrates the concept of mobility as implemented under the present invention. A room is shown having twenty one antennas A1–A21 deployed in 7/21 cell plan in order to obtain the desired frequency reuse distance for testing. In a exemplary snapshot in time $t_0$, a predefined cell pattern reflecting the cell plan is present, i.e. every fifth antenna is active, A1, A6, A11 etc. their associated coverage areas represented by the circles 305, 310, and 315 respectively. A mobile 300 is placed in a fixed location within a cell, for example, in coverage area 305 of antenna A1 and linked to a computer for automated control and monitoring. Additional mobiles may be linked to the computer and placed in any of the other cell coverage areas as well. Furthermore, the mobile 300 can be operated alone within the cells or can be operated together with a plurality of mobiles for tests associated with mass traffic, for example.

The movement of the stationary mobile is simulated by shifting the cell pattern in a step-wise manner such that each base station changes antenna to the adjacent antenna by means of the antenna matrix. A shift in the clockwise direction, for example, is indicated by the arrows. As the cell pattern rotates away from the stationary mobile, the signal strength from the current connection i.e. first cell appears to weaken which the mobile interprets as a movement in its position. When a second cell following the first cell rotates toward the stationary mobile, the received signal strength from the second cell becomes greater than from the first cell thereby inducing the mobile to initiate a handoff using standard handoff procedures. Therefore, a shift to the right in cell pattern represents a perceived movement to the mobile as a change in its position to the left.

Figure 4:
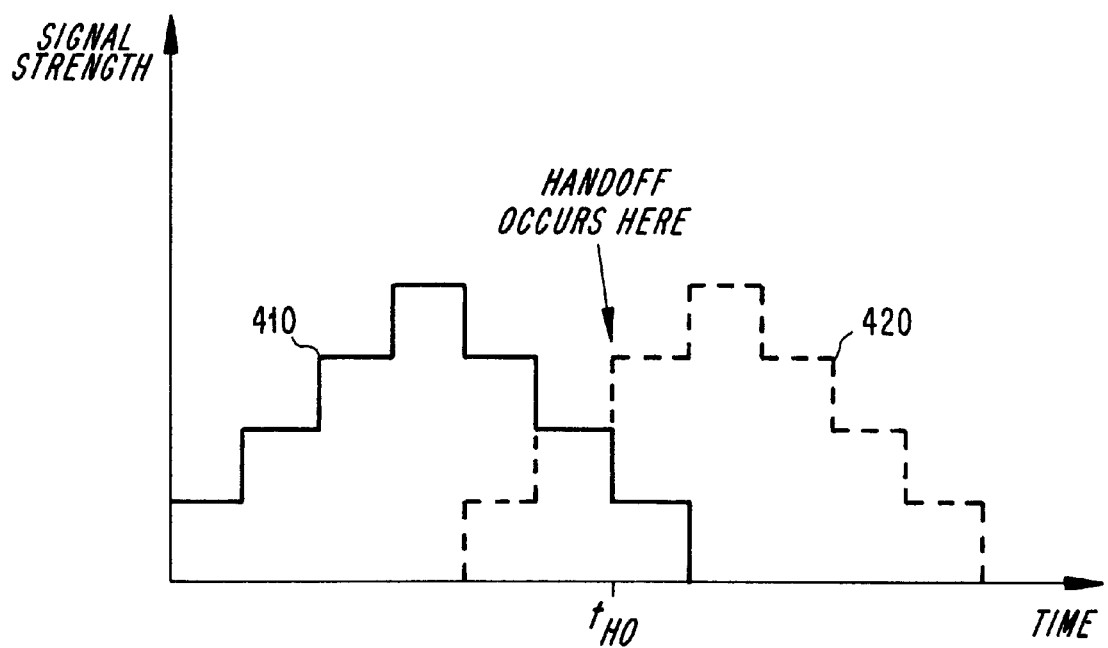
FIG. 4 shows a graph of the received signal strength of a mobile versus time.

FIG. 4 shows a graph of the received signal strength of a mobile versus time. As a first cell approaches the mobile, the signal strength received increases in step-wise manner until it reaches a peak, as represented by signal 410. As the first cell shifts away, the signal strength decreases accordingly in steps at the same time as a second cell that is approaching the mobile, as represented by signal 420. The signal strength of the second cell then increases and becomes stronger than the signal strength from the first cell at $t_{HO}$ at which point a handoff occurs. The pattern repeats for the remaining cells until the first cell rotates back around again. The invention utilizing the shifting of cells with respect to a stationary mobile ensures a consistent handoff environment in which to conduct various and repeated tests. Accordingly, it becomes possible to perform system optimization by adjusting various system parameters under these constant test conditions.

Additional tests can be readily implemented such as those involving a plurality of mobiles for testing interference on co-channels in cellular systems employing carrier frequency reuse plan in a plurality of cells. In these scenarios, mobiles in different cells can be configured to operate on co-channels in order to investigate interference related issues. By way of example, the frequency reuse distance may be chosen by forming different cell patterns conforming to 3/9, 4/12 etc. cell plans. Other types of testing using the present invention include interference driven channel selection, inter-MSC handoffs, traffic overload control, directed retry due to voice channel congestion, and base station power control issues, for example.

The present invention contemplates a space-efficient test platform that provides a more realistic environment for resting the air interface. Since real antennas are used in the test process, handoff and interference problems from the field can be readily investigated in the laboratory. Furthermore, the intrinsic nature of the testing using stationary components provides for consistent environmental conditions that is particularly suitable for repeat testing. Hence repetition of identical tests enables fine tuning of the system by optimizing parameters and permits the evaluation of new functions and algorithms under the same conditions.

While the invention has been described with reference to a specific embodiment, the description is illustrative of the inventive concept and is not to be construed as limiting to the invention. In particular, the inventive concept is also applicable to systems operating in accordance with Code Division Multiple Access (CDMA), for example. Various modifications and steps may occur to those skilled in the art without departing from the true spirit and scope of the invention as defined by the appended claims.

What is claimed is:

1. A test system for use in testing wireless telecommunication systems comprising:
    an antenna array comprising a plurality of individual antennas deployed in a fixed pattern within a testing area;
    an antenna matrix having a first and a second end, wherein the first end is connected to said antenna array;
    a plurality of base stations wherein each base station is connected to said second end of said antenna matrix;
    means for controlling said antenna matrix such that each of said plurality of base stations is selectively cross connected with an associated antenna; and
    at least one mobile located within communication range of one of said individual antennas.

2. A test system according to claim 1 wherein said antenna matrix is controlled by a program running on a computer workstation such that the base stations cross connected to the associated antennas create a pattern of activated cells.

3. A test system according to claim 1 wherein said individual antennas of the antenna array are deployed to provide the desired radio coverage of the test area.

4. A test system according to claim 1 wherein said at least one mobile is located in a fixed position.

5. A test system according to claim 2 wherein a plurality of mobiles are operated within one of said activated cells.

6. A test system according to claim 5 wherein each of said plurality of mobiles are remotely controlled and monitored by a computer workstation.

7. A method of testing a wireless telecommunication system, wherein the system having a plurality of base stations connected to a plurality of antennas via an antenna matrix, and wherein said antennas are deployed in a fixed pattern in a confined test area, and having at least one mobile located within the coverage area of at least one antenna, said method comprising the steps of:
    activating a first cell by selectively connecting a first base station to a first antenna via the antenna matrix;
    initiating a test procedure for testing aspects of mobile communications;
    activating a second cell by connecting said first base station to a second antenna via the antenna matrix; and
    monitoring and controlling the test procedure with a computer workstation.

8. A method according to claim 7 wherein activating a cell further includes controlling the antenna matrix with a program from a computer workstation.

9. A method according to claim 8 wherein the at least one mobile is placed in a fixed position.

10. A method according to claim 9 wherein a first cell serving the stationary mobile shifts away from said at least one mobile, and wherein a second cell following the first cell approaches the mobile such that the received signal strength of the second cell becomes stronger than that from the first cell thereby inducing a handoff to the second cell.

11. A method according to claim 7 wherein the testing procedure includes testing the air interface radio path for interference.

12. A method according to claim 7 wherein the testing procedure includes testing the air interface for problems associated with mass traffic.

13. A method according to claim 7 wherein the wireless telecommunication system is operating in accordance with a time division multiple standard such as digital advanced mobile phone system (D-AMPS).

14. A method according to claim 7 wherein the wireless telecommunication system is operating in accordance with a code division multiple access (CDMA) standard.

15. A test system for use in testing wireless telecommunication systems comprising:
    an antenna array comprising a plurality of individual antennas deployed in a fixed pattern within a testing area;
    an antenna matrix having a first and a second end, wherein the first end is connected to said antenna array;
    a plurality of base stations, wherein each base station is connected to said second end of said antenna matrix;
    means for controlling said antenna matrix such that each of said plurality of base stations is selectively cross connected with an associated antenna;
    at least one mobile located within communication range of one of said individual antennas, wherein a position of said mobile is fixed; and
    means for shifting a cell pattern such that one of the plurality of said base stations changes from a first antenna to a second antenna by means of said antenna matrix in order to simulate movement of the mobile unit.

16. A method of testing a wireless telecommunication system, wherein the system having a plurality of base stations connected to a plurality of antennas via an antenna matrix, and wherein said antennas are deployed in a fixed pattern in a confined test area, and having at least one mobile located within the coverage area of at least one antenna, wherein the at least one mobile is placed in a fixed position, said method comprising the steps of:
    activating a first cell by selectively connecting a first base station to a first antenna via the antenna matrix, wherein a program from a computer workstation controls the antenna matrix to activate the first cell;
    initiating a test procedure for testing aspects of mobile communications;
    activating a second cell by connecting said first base station to a second antenna via the antenna matrix, wherein the program from the computer workstation controls the antenna matrix to activate the second cell; and
    monitoring the test procedure with said computer workstation.

* * * * *